United States Patent
Guionnet et al.

(10) Patent No.: US 7,438,105 B2
(45) Date of Patent: Oct. 21, 2008

(54) METHOD FOR SERIAL PRODUCTION OF SECURE DOCUMENTS AND MACHINE THEREFOR

(75) Inventors: Sébastien Guionnet, Neuilly sur Seine (FR); Jérôme Ageron, Chatou (FR); Claude Bricot, Villejuif (FR); Philippe Robin, Bourg la Reine (FR); Yves Thebault, Verriere-le-Buisson (FR)

(73) Assignee: Thales (FR)

( * ) Notice: Subject to any disclaimer, the term of this patent is extended or adjusted under 35 U.S.C. 154(b) by 286 days.

(21) Appl. No.: 10/518,289

(22) PCT Filed: Jul. 5, 2002
(Under 37 CFR 1.47)

(86) PCT No.: PCT/FR02/02368
§ 371 (c)(1),
(2), (4) Date: Dec. 17, 2004

(87) PCT Pub. No.: WO2004/005038
PCT Pub. Date: Jan. 15, 2004

(65) Prior Publication Data
US 2006/0289114 A1    Dec. 28, 2006

(51) Int. Cl.
B32B 41/00 (2006.01)
(52) U.S. Cl. .......... 156/378; 156/379; 156/387
(58) Field of Classification Search ........... 156/361, 156/378, 379, 387, 510, 521, 584, 566
See application file for complete search history.

(56) References Cited
U.S. PATENT DOCUMENTS

| | | | |
|---|---|---|---|
| 3,837,725 A | 9/1974 | Bricot et al. | |
| 5,566,982 A | 10/1996 | Lehureau et al. | |
| 5,889,267 A | 3/1999 | Robin et al. | |
| 5,948,199 A | 9/1999 | McGrew | |
| 6,162,486 A | 12/2000 | Samouilhah et al. | |
| 6,299,719 B1 | 10/2001 | Traband et al. | |
| 6,308,630 B1 * | 10/2001 | Kurokawa et al. | 101/492 |
| 6,315,023 B1 * | 11/2001 | King et al. | 156/494 |
| 6,873,443 B1 | 3/2005 | Joubert et al. | |

FOREIGN PATENT DOCUMENTS

| | | |
|---|---|---|
| FR | 2780915 | 1/2000 |
| FR | 2796184 | 1/2001 |
| FR | 2826135 | 12/2002 |
| WO | WO0053423 | 9/2000 |

* cited by examiner

Primary Examiner—George R Koch, III
(74) Attorney, Agent, or Firm—Lowe Hauptman Ham & Berner, LLP

(57) ABSTRACT

The method of the invention consists, on the one hand, in serially recording on a tape of photosensitive film a succession of volume holograms each relating respectively to an item of information of a corresponding document to be made secure, each of these holograms being accompanied by an identification and positioning code printed on the same film, in developing and in fixing the holograms thus recorded, and on the other hand in printing at the same time the identity documents with their individual identification codes which are the same as those of the respective corresponding holograms, in adding an adhesive to the holograms after their fixing, and in adhesively bonding together each hologram and the corresponding document after verifying that their respective identification codes match.

14 Claims, 1 Drawing Sheet

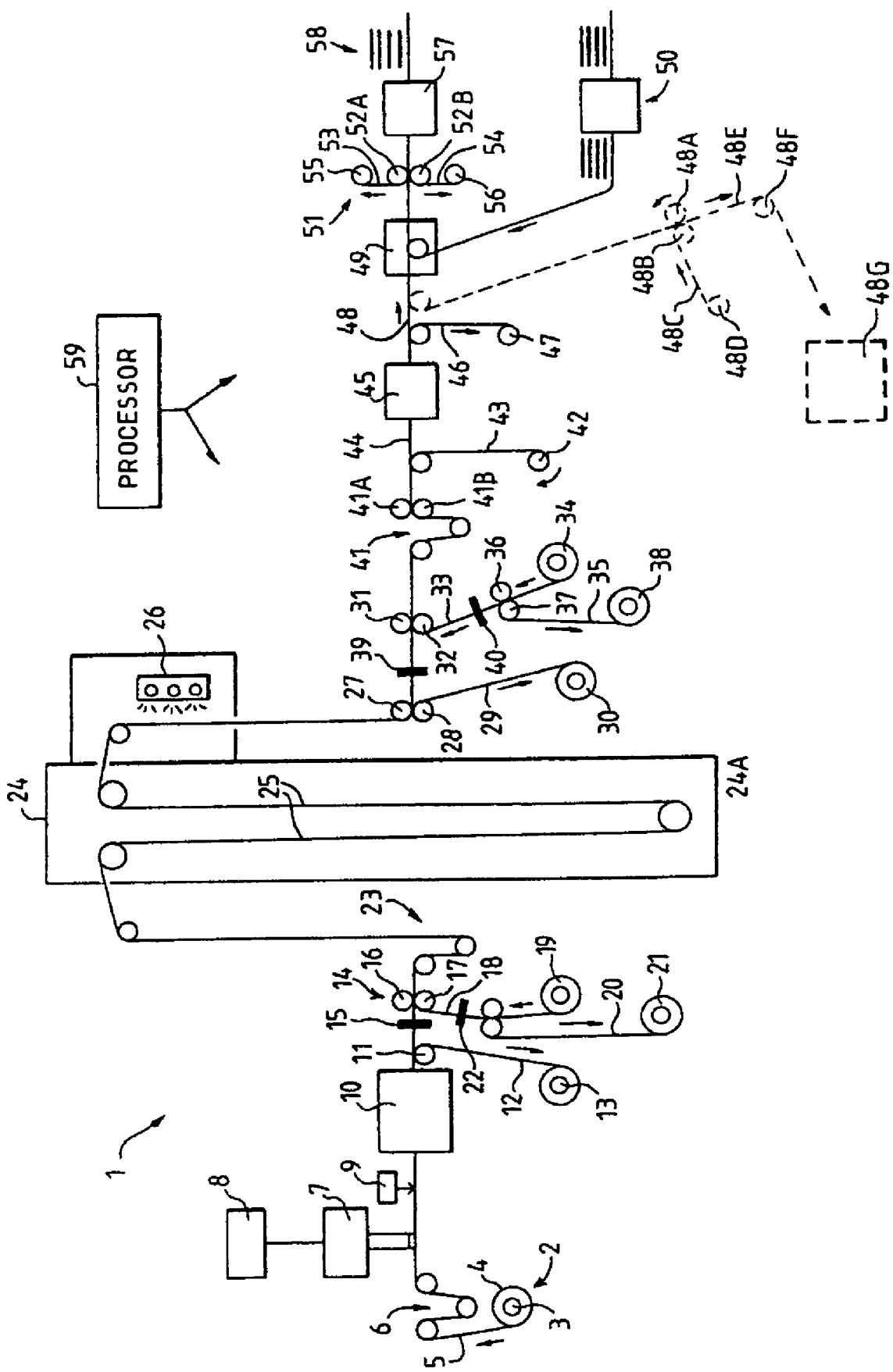

US 7,438,105 B2

METHOD FOR SERIAL PRODUCTION OF SECURE DOCUMENTS AND MACHINE THEREFOR

This application is a 371 of PCT/FR02/02368, filed Jul. 5th, 2002.

FIELD OF THE INVENTION

The present invention pertains to a method of serial manufacture of secure objects, as well as to a machine for implementing this method.

DESCRIPTION OF RELATED ART

The security elements used to authenticate identity documents are generally impersonal elements (arbitrary holographic figures, etc.) that are recurrent (the same for the whole of a large series of documents). They are therefore inefficient in the struggle against falsification and counterfeiting. For example, the same hologram, representing the same pattern, is found on all credit cards. In the case of identity cards, the same patterns are always found. Falsification or counterfeiting is then easy, provided that these security elements are not degraded or that they are procured.

The personalization of security elements considerably reduces the possibilities of falsification and renders counterfeiting very difficult. A personalized security element is a component that assumes one or more items of information from the card. Any modification of an item of information contained both on the card and in the security element, a photograph of the bearer, a name or a number for example, must be accompanied by the corresponding modification of the security element. Consequently, it is then necessary to counterfeit not only this element, but also its environment: it is necessary to have the raw material of its support and the technical skills to reproduce it.

Optical security elements, in particular holograms, are the most efficient against falsification and counterfeiting. Specifically, the hologram, by virtue of its physical properties, possesses the dual advantage of not being able to be copied by reprography (with the aid of toner) or any other method of photocopying, and of having a strong visual effect. However, it is currently still not known how to personalize holograms in real time. Known holograms are either stamped holograms, or volume holograms recorded within the thickness of photosensitive materials of argentic type. In both these cases, the method of recording calls upon techniques that are incompatible with industrial methods of fabricating cards. For example, the development of volume holograms recorded in argentic materials requires the use and manipulation of liquid chemical products.

Furthermore, it is known how to record holograms in real time through the use of novel photosensitive materials of photopolymer type, doing so by recourse to conventional industrial processes. The method of recording holograms with these novel materials has the advantage of being totally dry, unlike the other aforesaid methods, whether they call upon argentic materials or those based on dichromated gelatin.

A system allowing the complete fabrication of an identity document containing a personalized hologram is a complex system. This complexity makes it impossible to produce this type of document on a local scale on simple machines. Specifically, in addition to the conventional printing and laminating modules, the machine must comprise a hologram recording module composed of a laser emitter and of a sophisticated optical setup. Synchronization of all the modules is difficult to achieve. Furthermore, the recording of such an optical component necessitates stability conditions that are very constraining for the system as a whole. Finally, the hologram recording time considerably limits the rate of production of cards. The implementation and maintenance of such a system necessitate permanent monitoring by qualified operators.

A subject of the present invention is a method of producing hologram-secured documents in which the holograms definitely identify the documents on which they are affixed, without risk of confusion with conventional standard holograms, which method may be implemented with the aid of conventional industrial processes, in a simple and fast manner, in large series, while producing documents that are very difficult to falsify or to counterfeit.

A subject of the present invention is also a machine for implementing this method, which machine is fast and dependable, simple to use and requires only a minimum of servicing.

SUMMARY OF THE INVENTION

The method in accordance with the invention consists on the one hand, in serially recording on a tape of photosensitive film a succession of volume holograms each relating respectively to an item of information of a corresponding document to be made secure, each of these holograms being accompanied by an identification and positioning code printed on the same film, in developing and in fixing the holograms thus recorded, and on the other hand in printing at the same time the identity documents with their individual identification codes which are the same as those of the respective corresponding holograms, in adding an adhesive to the holograms after their fixing, and in adhesively bonding together each hologram and the corresponding document after verifying that their respective identification codes match, and, preferably in covering the whole with a protection which is advantageously made secure.

The machine in accordance with the invention comprises a holographic recording and identification code printing station, a hologram development station, a station for adding colorant film, a fixing station, a station for adding adhesive, a station for printing documents and a station for bonding the holograms to the documents and a lamination station.

BRIEF DESCRIPTION OF THE DRAWING

The present invention will be better understood on reading the detailed description of a mode of implementation, taken by way of nonlimiting example and illustrated by the appended drawing, the single FIGURE of which is a simplified diagram of an exemplary machine for implementing the method of the invention.

DETAILED DESCRIPTION OF THE INVENTION

The present invention is described hereinbelow with reference to the fabrication of identity cards, but it is of course not limited solely to this application, and it may be implemented to fabricate very diverse secure documents: passports, credit cards, badges for access to protected areas, authenticity certificates, etc.

The machine 1 represented in the drawing comprises a first station 2 furnished with means 3 of support making it possible to receive coils 4 of photosensitive film 5. This film 5 is protected on one of its faces by a Mylar film, and on the other face by a PVC film, for example. The film 5 passes through a pulley block 6 and arrives at a facility 7 for recording holograms, which is for example of the type described in French Patent No. 2 796 184. At the level of this facility 7, the film 5 arrives with the said Mylar film on its upper face (as seen in the drawing), the PVC film being on its lower face. The facility 7 essentially comprises a laser emitter, a spatial light modulator controlled by the production computer 59 described later (for example of the liquid crystal cell type), lenses and optical components for guiding and concentrating the beam of the laser emitter, as well as the circuits necessary for the display by the spatial modulator of patterns provided by a database 8. The facility 7 is followed by a facility 9, which comprises for example a printer, and which is responsible for affixing onto the film 5 an identification mark near each hologram printed at the facility 7. This mark may, for example, be a bar code, but it is of course possible for it to be any other type of marking allowing easy and unambiguous identification of each of the holograms from among a large number (several thousand holograms may be formed on one and the same tape of film 5). The facility 9 is followed by a facility 10 for irradiating the film 5. This facility 10 comprises ultraviolet lamps applying a power of around 70 mW/cm$^2$ for example to the film 5. Each of the holograms can comprise at least one of the following elements: a photograph identical to that printed on the document, a name, a number, another photograph, a code.

At the exit of the facility 10, there is a roll 11 making it possible to divert the lower protective film 12 (PVC film) of the film 5 toward a take-up coiling roll 13, while the photosensitive film together with its upper protective film (of Mylar) is conveyed to a lamination facility 14, passing in front of a device 15 for eliminating static electricity. The facility 14 comprises two heating pressure rolls 16, 17 between which is made to pass the irradiated photosensitive film together with its upper protective film and a colorant film 18 which is applied against the lower face of the photosensitive film. This film 18 originates from a feed roll 19 on which this film is wound together with a protective film (of polypropylene for example). This protective film 20 is removed as and when the film 18 is used and wound on a take-up roll 21. An antistatic device 22 is fixed around, or in proximity to, the film 18, just downstream of the place where it is separated from the film 20. At the exit of the facility 14 there is a pulley block 23, which precedes a hot air circulation oven 24 in which the composite film 25 issuing from the facility 14 travels a path at even speed for a time of 8 to 20 minutes approximately, and a temperature of between 120 and 180° C. approximately, depending on the desired final color of the holograms. This film 25 comprises the following layers: the initial protective layer (of Mylar for example), the photosensitive film, the colorant film 18 and the protective film (Mylar for example) for the colorant film. At the exit of the oven 24 there is a fixing chamber 26 comprising a bank of ultraviolet radiation lamps applying a luminous power of 5 mW/cm$^2$ for example to the film.

At the exit of the chamber 26 there is a pair of rolls 27, 28 gripping the film and making it possible to delaminate the protective film 29 from the colorant film. This film 29 is wound onto a take-up roll 30. Downstream of the rolls 27, 28 are heating pressure rolls 31, 32 making it possible to add an adhesive film 33, in place of the protective film 29 that had just been removed, to the composite film arriving thereat. The adhesive film 33 originates from a feed roll 34. On this roll 34, the film 33 was wound together with an upper protective film 35 which is removed immediately after passing between two rolls 36, 37 and wound onto a take-up roll 38. Antistatic devices 39, 40 are placed immediately downstream of the rolls 27, 28 and 31, 32 respectively.

Downstream of the rolls 31, 32 is placed a pulley block 41 followed by two rider rolls 41A, 41B and by a roll 42 onto which the remaining lower protective film 43 for the adhesive 33 is wound. The resulting composite film then passes through a facility 45 for cutting out the holograms that it contains, the cutting out leaving behind the upper protective film, which thus serves as support for transporting the holograms. After cutting out, what remains, that is to say the now useless part 46 of the composite film (the part referred to as the "skeleton"), is wound onto a take-up roll 47. The "skeleton" comprises several layers formed of parts of films whose surface has not been used for the holograms, these films being: the photosensitive film, the adhesive film, the colorant film and the upper protective film for the photosensitive film.

According to a variant of the invention (represented by dashed lines in the drawing), the film 48, comprising the said upper protective film and the holograms, passes between rolls 48A, 48B which make it possible to add a protective film 48C thereto, originating from a roll 48D, this protective film being bonded adhesively to the holograms. The resulting composite film 48E is wound onto a take-up roll 48F, so as to be used subsequently in a station 48G for printing documents and for transferring holograms, in a manner analogous to that described hereinbelow with reference to the description of the elements 49 to 58. The elements 48A to 48G constitute, like the elements 49 to 58, a station for completing production of secure documents.

If the variant just described is not implemented, the assembly 48 of the said upper protective film and of the holograms passes through a facility 49 for checking and for transferring holograms onto documents to be made secure. This facility 49 essentially comprises a device for comparing identification codes and a device for transferring holograms onto the documents. These documents are printed in a printing facility 50 and transported to the facility 49. At the exit of the facility 49, the documents furnished with their holograms pass through a laminating facility 51 in which they are laminated between heating lamination rolls 52A, 52B with an upper protective film 53 and a lower protective film 54 originating from rolls 55, 56, respectively. The laminated tape thus obtained passes through a cutting facility 57, and the individual secure documents are stored temporarily in a take-up facility 58.

A processor 59 manages all the elements described hereinabove in tempo with the images to be recorded: advancing of the films and tapes, irradiation, oven and developing banks, printing of the holograms from the database 8, printing of the identification codes and of the documents, etc.

The operation of the machine described hereinabove is as follows. The photosensitive film 5, stored on the feed roll 3, is pulled in a discontinuous manner by a stepper motor (not represented) acting for example on the rolls 16, 17. The pulley block 6 prevents jerks during the unwinding of the film 5 which unwinds in a continuous manner from the roll 3, while the pulley block 23 allows the film to pass in a continuous manner through the oven 24 and beyond, up to the pulley block 41. The film 5 passes firstly through the facility 7, where it is held on a holographic "master" by suction and/or under the effect of a roll which keeps it hard against this "master". At this facility 7, the photosensitive film is irradiated by a laser beam passing through a liquid crystal cell, to which the database 8 dispatches on each occasion an item of unique personalization information (for example the photograph of the bearer of each corresponding identity card fabricated by the machine 1). The "master" is a holographic mirror containing recurrent information (logos, text, etc) in three dimensions and possibly optical security features invisible to the naked eye. The operation of this recording facility will not be described in greater detail, since it is the same as that described in the aforesaid French patent No. 2 976 184. After having been irradiated in the facility 7, the photosensitive film receives at the facility 9 a placement and identification mark (bar code for example with a tag making it possible to pinpoint the exact location of the hologram with respect to the tape). These marks may be printed with an inkjet or thermal printer, for example. The identification marks make it possible to unambiguously identify the corresponding holograms, in the same manner as the marks of the documents printed by the printer of the facility 50 are identified, and hence to assemble each hologram with the corresponding document.

After the facility 9, the film is driven towards the facility 10 in which the rays containing ultraviolet fix the information recorded in the photosensitive material. At the facility 14, a colorant film 18 is added to the photosensitive film. This photosensitive film is generally green after fixing, and in order to improve the contrast and readability thereof, this colorant film is added thereto, doing so by lamination between the heating rolls 16, 17, at 120° C. for example. The said stepper motor may for example drive these rolls 16, 17.

The composite film thus obtained at the exit of the rolls 16, 17 is treated in the oven 24, at a temperature, of between 120° C. and 180° C., which is dependent on the desired final color of the hologram. The continuous advancing of the composite film through the oven makes it possible to limit the deformations of the film in contact with the rolls over which it passes in this oven. According to an example of production, the heating in the oven is effected by circulation of hot air with a minimum overall flow rate of approximately 50 l/min, this air being recycled within the oven so as to enhance its thermal stability and its thermal homogeneity. The oven 24 is furnished with a "dancer" 24A, which is an adjustable-position roll, thereby making it possible to tailor the residence time of the composite film in the oven to the production speed of the machine 1 by adjusting the length traveled by the film in the oven and to determine the final color of each hologram. The bank 26 of ultraviolet lamps makes it possible to stop the reaction activated in the oven 24 and thus to fix the color of the hologram. The rolls 31 and 32 make it possible to add the adhesive film 33 to the composite film and to advance the film continuously downstream of the pulley block 23, these rolls being propelled by a continuous-rotation motor.

The exit rolls 41A, 41B of the pulley block 41 are propelled by a stepper motor, this making it possible to present the film to the facility 45 hologram by hologram so as to be able to cut out each hologram, after having removed the adhesive's protective film.

To match each identity card up with its proper hologram, the facility 49 comprises means for reading bar codes and reticules, a comparator for comparing each code read on the identity card which arrives at this facility with the code read on the hologram which arrives thereat at the same time, and it also comprises means controlling the advancing of the film supporting the holograms so that the correct hologram is brought face-on to the identity card which is present thereat. This comparator triggers means of signaling or of alarm if the hologram present is not the correct one, or else it can instruct the subsequent reprinting of the identity card for which the corresponding hologram is not found, and even the corresponding hologram, so as not to have to stop the machine. The reticules printed on the film of holograms serve to position each of the holograms face-on to the location that it must occupy on the appropriate identity card. When a hologram is thus correctly positioned, a "wedge" or a heating roll applies it against the identity card. After the hologram has been put in place in this way, each identity card thus completed is conveyed to the laminating rolls of the facility 51.

Of course, the steps of putting the holograms in place on the identity cards may be effected in an equivalent manner by implementing other steps known per se. For example, the operations of cutting out the holograms and of putting them in place on the identity cards may be coupled, thereby making it possible to keep the upper protective film (Mylar) of each hologram. As a variant, this protective film may be cut out partially to 99% for example) so as to guide the holograms better.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A machine for producing hologram-secured documents, comprising:
    a holographic recording and identification code printing station;
    a hologram development station;
    a station for adding colorant film;
    a fixing station, a station for adding adhesive;
    a station for cutting out the holograms;
    a roll for taking up the cutout remains; and a station for completing production of secure documents; and
    a database linked to the holographic recording and identification code printing station.

2. The machine as claimed in claim 1, wherein the station for completing production of documents is placed after the station for cutting out the holograms and comprises a station for printing documents and a station for bonding the holograms to the documents.

3. The machine as claimed in claim 2, wherein it comprises a pulley block upstream of the holographic recording station, a pulley block upstream of the fixing station and a pulley block upstream of the station for bonding the holograms to the documents.

4. The machine as claimed in claim 2, wherein it comprises in the station for completing the production of documents a comparator linked on the one hand to means of reading codes on the documents and on the holograms, and on the other hand to means of signaling of an alarm.

5. The machine as claimed in claim 2, wherein it comprises a roll with adjustable position making it possible to determine the final color of each hologram.

6. The machine as claimed in claim 1, wherein the station for completing production of documents comprises, after the station for cutting out the holograms, means of bonding of a protective film, and means of storage, and a station for printing documents and for transferring holograms.

7. The machine as claimed in claim 6, wherein it comprises a pulley block upstream of the holographic recording station, a pulley block upstream of the fixing station and a pulley block upstream of the station for bonding the holograms to the documents.

8. The machine as claimed in claim 6, wherein it comprises in the station for completing the production of documents a comparator linked on the one hand to means of reading codes on the documents and on the holograms, and on the other hand to means of signaling of an alarm.

9. The machine as claimed in claim 6, wherein it comprises a roll with adjustable position making it possible to determine the final color of each hologram.

10. The machine as claimed in claim 1, wherein it comprises a pulley block upstream of the holographic recording station, a pulley block upstream of the fixing station and a pulley block upstream of the station for bonding the holograms to the documents.

11. The machine as claimed in claim 10, wherein it comprises in the station for completing the production of documents a comparator linked on the one hand to means of reading codes on the documents and on the holograms, and on the other hand to means of signaling of an alarm.

12. The machine as claimed in claim 1, wherein it comprises in the station for completing the production of documents a comparator linked on the one hand to means of reading codes on the documents and on the holograms, and on the other hand to means of signaling of an alarm.

13. The machine as claimed in claim 1, wherein it comprises a roll with adjustable position making it possible to determine the final color of each hologram.

14. The machine as claimed in claim 1, wherein the station for completing the production of documents comprises a comparator linked to means of reading codes on the documents and on the holograms, and to means of signaling of an alarm.

* * * * *